US007748503B2

(12) United States Patent
Eichhorn et al.

(10) Patent No.: US 7,748,503 B2
(45) Date of Patent: Jul. 6, 2010

(54) CABLE FIXING POINT FOR FASTENING AT LEAST ONE CABLE AND ELEVATOR WITH AT LEAST ONE CABLE FIXING POINT FOR AT LEAST ONE CABLE

(75) Inventors: Roland Eichhorn, Oberkulm (CH); Gert Silberhorn, Kussnacht (DE)

(73) Assignee: Inventio AG, Hergiswil NW (CH)

( * ) Notice: Subject to any disclaimer, the term of this patent is extended or adjusted under 35 U.S.C. 154(b) by 98 days.

(21) Appl. No.: 11/862,728

(22) Filed: Sep. 27, 2007

(65) Prior Publication Data

US 2008/0236957 A1 Oct. 2, 2008

Related U.S. Application Data

(62) Division of application No. 11/216,427, filed on Aug. 31, 2005, now abandoned.

(30) Foreign Application Priority Data

Aug. 31, 2004 (EP) ................................ 04405540

(51) Int. Cl.
*B66B 7/08* (2006.01)
*B66B 7/10* (2006.01)
*F16G 11/00* (2006.01)

(52) U.S. Cl. ...................... 187/411; 187/412; 24/115 R

(58) Field of Classification Search ................. 187/411, 187/412; 182/145; 24/115 R; *B66B 7/08, B66B 7/10*

See application file for complete search history.

(56) References Cited

U.S. PATENT DOCUMENTS 1,861,908 A * 6/1932 Culp .......................... 187/411

(Continued)

FOREIGN PATENT DOCUMENTS

EP 1 026 115 A1 8/2000

(Continued)

OTHER PUBLICATIONS

Derwent Abstract Accession No. J2311Y/40 Feb. 7, 1977 "Coupling Device for Mine Shaft Lifting Skip . . .".

(Continued)

*Primary Examiner*—John Q Nguyen
*Assistant Examiner*—Stefan Kruer
(74) *Attorney, Agent, or Firm*—Fraser Clemens Martin & Miller LLC; William J. Clemens

(57) ABSTRACT

A cable fixing point for fastening at least one cable includes a cable end fastening for the cable end and a rotary mounting for the cable end fastening, wherein the rotary mounting enables rotation of the cable end fastening about an axis and the axis can be aligned by a tension force acting on the cable. In an elevator for transporting at least one load carrier by at least one cable movable in its longitudinal direction wherein the respective cable at the cable end is disposed under a tension force, the direction of which is variable in dependence on a position of the load carrier, this cable fixing point permits rotation of the cable at the cable fixing point about an axis which is aligned in the respective direction of the tension force and/or in the respective longitudinal direction of a cable segment adjoining the cable fixing point.

13 Claims, 5 Drawing Sheets

U.S. PATENT DOCUMENTS

| | | | | | |
|---|---|---|---|---|---|
| 1,924,690 | A | * | 8/1933 | Lindstrom et al. | 187/412 |
| 1,941,964 | A | | 1/1934 | Zapf | |
| 2,089,143 | A | | 8/1937 | White | |
| 4,537,286 | A | | 8/1985 | Morris et al. | |
| 4,687,365 | A | * | 8/1987 | Promersberger | 403/2 |
| 5,816,732 | A | * | 10/1998 | Nissen | 403/327 |
| 6,341,669 | B1 | * | 1/2002 | St. Pierre et al. | 187/412 |
| 7,077,241 | B1 | * | 7/2006 | Liebetrau et al. | 187/266 |

FOREIGN PATENT DOCUMENTS

| | | | | |
|---|---|---|---|---|
| EP | 1 123 891 | A2 | | 8/2001 |
| EP | 1123891 | A2 | * | 8/2001 |
| JP | 06211464 | A | * | 8/1994 |
| JP | 08067458 | A | * | 3/1996 |
| WO | WO 99/43591 | A1 | | 9/1999 |
| WO | WO 02/00541 | A1 | | 1/2002 |

OTHER PUBLICATIONS

Derwent Abstract Accession No. L0557Y/50 Mar. 21, 1977 “Power Station Stack Hoist Control.”

Derwent Abstract Accession No. 88-069530/10 Jul. 30, 1987 “Rope Coupling Device . . .”

* cited by examiner

CABLE FIXING POINT FOR FASTENING AT LEAST ONE CABLE AND ELEVATOR WITH AT LEAST ONE CABLE FIXING POINT FOR AT LEAST ONE CABLE

CROSS-REFERENCE TO RELATED APPLICATION

This application is a divisional of the co-pending U.S. Pat. application Ser. No. 11/216,427 filed Aug. 31, 2005.

BACKGROUND OF THF INVENTION

The present invention relates to a cable fixing point for fixing at least one cable and to an elevator for transporting at least one load carrier by means of at least one cable, which is movable in its longitudinal direction, with a cable fixing point for a cable end of the respective cable.

Cables provided for supporting and transporting load carriers (for example a car or a counterweight) in an elevator are usually held at the cable ends at cable fixing points and between the cable fixing points are movable at least in segments in their longitudinal direction along tracks which are controlled by means of a suitable guide device for the cables. The respective cable fixing points can, for example, be arranged or fastened at the roof or base of an elevator shaft or at a load carrier of the elevator. The guide device usually comprises one or more rollers, around which the cables must run during movement in the longitudinal direction thereof, particularly a drive roller by which the traction forces can be transmitted to the cables, and optionally deflecting rollers.

When the cables are moved in their longitudinal direction during operation of the elevator they can in certain circumstances execute at the same time a rotational movement about their longitudinal direction at the guide device. Rotation of the cable about its longitudinal direction can, for example, be produced at the guide device if the cable is disposed at the guide device under a "diagonal" tension and is moved under boundary conditions which allow rotation of the cable about its longitudinal direction. That is the case when the cable is disposed under tension in its longitudinal direction and in that case is guided at a guide surface (for example at the surface of a roller) in a direction which is not parallel, but which lies at an inclination relative to the longitudinal direction of the cable. In the case of a cable which is disposed under a tension acting in its longitudinal direction and is guided in a groove at the surface of a roller the diagonal tension is realized if, for example, the groove is arranged within a plane standing perpendicularly to the axis of rotation of the roller and the cable is not guided parallel to this plane. In these circumstances the cable cannot be guided exclusively at the base of the groove if the roller rotates about its axis of rotation and the cable is then moved in its longitudinal direction. Rather, the cable runs partly over the flanks of the groove and thus transversely to the groove and can in that case execute a rolling motion at the surface of the roller in the direction of the axis of rotation of the roller. The rolling motion of the cable is in that case accompanied in each instance by a rotation of the cable about its longitudinal direction.

Diagonal tension unintentionally occurs in elevators in certain circumstances, for example when the guide device for the cables and the cable fixing points in the case of mounting are not precisely aligned in such a manner that every cable is guided at the guide device in each instance parallel to the direction of tension. In other cases diagonal tension is unavoidable—and accordingly intended—due to the construction of the cable guide. The latter is the case, for example, when several cables are guided respectively adjacent to one another over a first roller and subsequently over a second roller, but the axes of rotation of the rollers are not arranged exactly parallel to one another. In this case in a given instance one of the cables can be so guided that it is not disposed under diagonal tension. However, the remaining cables necessarily stand under a diagonal tension at least one of the rollers.

Rotational movements introduced into a cable can in turn lead to twistings (torsions) of the respective cable or individual length segments of the respective cable about the respective longitudinal direction. This is the case when the cable in the event of rotational movement about its longitudinal direction is not uniformly rotated about the same angle over its entire length. As a rule, twistings of the cables are connected with torsional moments which the respective cable exerts on the guide device or the cable fixing points.

A length segment of the cable shall be termed a "cable segment" in the following.

If a cable twists, the structure of the cable can be changed, in some circumstances irreversibly. A cable usually consists of several tensile carriers which are "stranded" together. Usually several tensile carriers—for example strands which are made of metallic wires and/or synthetic fibers and/or natural fibers—are each laid helically in a (tensile carrier) layer or several (tensile carrier) layers about a centrally arranged tensile carrier. In this manner the tensile carriers of a tensile carrier layer form a periodic arrangement which repeats each time in the same manner in the longitudinal direction of the cable respectively after a characteristic distance (the "lay length"). In the case of twisting of the cable about its longitudinal direction the relative arrangement of the tensile carriers can in certain circumstances be irreversibly changed and the cable damaged in that case. In the case of twisting of a cable, in particular, the lay length of the tensile carriers within a tensile carrier layer is shortened or extended.

The effect of twisting of a cable segment is, for the arrangement of the tensile carriers in the region of the cable segment, dependent on which rotational sense the ends of the cable segment are twisted relative to one another. Twisting of a cable segment shall here be regarded as "twisting-up" when the twisting is connected with a shortening of the lay length of a tensile carrier layer in this cable segment. Correspondingly, a torsional moment which, introduced into the cable or a segment of the cable, causes shortening of the cable length shall be termed "twisting-up" torsional moment. Analogously, twisting of a cable segment is here termed "untwisting" when the twisting is connected with extension of the lay length of a tensile carrier layer in this cable segment. Correspondingly, a torsional moment which, introduced into the cable or a segment of the cable, causes extension of the lay length shall be termed "untwisting" torsional moment.

Cables can be damaged not only by excessive twisting-up, but also by excessive untwisting of a tensile carrier layer. Many cable constructions are particularly sensitive to untwisting of a tensile carrier layer, particularly relative to untwisting of the outermost tensile carrier layer. If, for example, cables disposed under the action of a tensile load are untwisted then the individual tensile carriers are always unevenly loaded by the tensile load. The most strongly loaded tensile carriers can be degraded to increased extent and, in a given case, destroyed. This effect can substantially reduce the service life of a cable.

In an elevator, rotational movements of the cables should accordingly be so controlled that twistings or torsional moments, which in a given case are introduced into the cables, in each instance do not exceed a specific tolerable amount.

A cable fixing point for fastening at least one cable is shown in European patent document EP 1026115 A1, which comprises a respective cable end fastening for a cable end of the respective cable and a respective rotary mounting for the respective cable end fastening, wherein each rotary mounting comprises an axial bearing which enables rotation of the respective cable end fastening about a fixed, vertically arranged axis. Cable fixing points of that kind are used in an elevator in order to fix the ends of cables by which load carriers of the elevator are conveyed. The axial bearings ensure that the cables can freely rotate about their longitudinal direction at the cable fixing points. In this case the cables are in each instance so held at the cable fixing points that no torsional moment is introduced into the respective cable at the cable fixing points. The latter shall have the effect that rotations and/or twistings and/or torsional moments which in certain circumstances are introduced 110 into one of the cables between the respective cable fixing points, for example during running around a drive pulley or deflecting rollers, can be conducted away into the axial bearings of the cable fixing points. In this manner it shall, in particular, be achieved that the extent of such twistings, which in certain circumstances are introduced into a cable segment of a cable adjoining a cable fixing point, is rapidly reduced again as a consequence of appropriate rotation of the cable ends. In this manner, in particular, the cable segments adjoining the fixing points shall be preserved.

The elevator shown in EP 1026115 A1 has a number of disadvantages, when a cable, which is fastened to the cable fixing point, of the elevator is guided so that the cable segment adjoining the cable fixing point runs not exactly vertically, but at a specific angle of inclination relative to the vertical. In this case the tension force acting on the cable and thus directed parallel to the longitudinal direction of the cable is introduced into the cable fixing point at the cable end fastening of the cable in a direction which is inclined with respect to the vertical by the stated angle of inclination. The size of the angle of inclination under these preconditions usually depends on the instantaneous position of the respective load carrier of the elevator and is thus changed during transport of the load carriers. These effects lead to several technical problems. On the one hand, the axial bearing connected with the cable end fastening of the cable is loaded radially relative to the axis of rotation of the axial bearing. The axial bearing can rapidly wear under the effect of radial forces unless expensive countermeasures are taken. Moreover, the cable is bent to the side at the cable end fastening and in that case may be strongly curved or kinked. The tensile carriers of the cable and in a given case further components of the cable (for example, an outer cable casing or an intermediate layer arranged between two different tensile carrier layers) are accordingly non-uniformly loaded by the tension force. A part of the tensile carriers is consequently loaded more than average and can accordingly degrade more rapidly. Due to the fact that the cable during transporting movements of the load carriers is constantly rotated about its longitudinal direction and thus at the cable fixing point constantly about the vertical axis of rotation of the axial bearing, the cable at the cable end fastening is loaded in reverse bending on each reversal of the travel direction of the load carriers. These reverse bendings similarly promote degradation of the cable. For example, the arrangement of the tensile carriers in the region of the cable end fastening can be reversibly changed by reverse bending and the cable thus damaged. A further problem is to be observed if the cable is not constructed so that it is absolutely free of rotation. In this case a tensile carrier layer of the cable can be twisted under the action of the tension load, since the axial bearing enables free rotation of the cable at the cable fixing point and cannot apply a torsional moment which could counteract the untwisting of the tensile carrier layer. This effect can even arise when the load carriers of the elevator are not transported.

SUMMARY OF THE INVENTION

The present invention is based on the task of avoiding the disadvantages stated above and of providing a cable fixing point for fastening at least one cable, and an elevator for conveying at least one load carrier by means of at least one cable, which is movable in its longitudinal direction, with at least one cable fixing point for a cable end, so that rotational movements of the respective cable can be controlled in a manner preserving the cable even when the cable fixing point is loaded by a tension force which acts on the cable and the direction of which departs from the vertical and/or the direction of which can be predetermined as desired at least within an angular range.

The cable fixing point according to the present invention comprises a cable end fastening for a cable end of the respective cable and a respective rotary mounting for the respective cable end fastening, wherein each rotary mounting enables rotation of the respective cable end fastening about an (rotational) axis. According to the present invention the rotary mounting is so constructed that the axis can be aligned by a tension force acting on the cable. The axis is accordingly not rigidly arranged. It automatically changes its direction or alignment when the direction of the tension force acting on the respective cable is changed. The axis can be aligned under the effect of the tension force in such a manner that the components of the tension force acting radially with respect to the axis are minimal. The rotary mounting accordingly has to be capable of high loading only in the direction of the respective tension force. Thus the precondition is created that the rotary mounting can be realized by relatively simple means. Moreover, the respective cable, when it is set at the cable fixing point into rotation about its longitudinal direction, has only minimal loading by reverse bending.

In one embodiment of the cable fixing point according to the present invention the axis can be aligned in the direction of a tension force acting on the cable and/or in the longitudinal direction of a cable segment adjoining the cable fixing point. This has the advantage that the rotary mounting is not loaded by any forces acting radially relative to the axis and accordingly can be realized by particularly simple means. Moreover, the respective cable, when at the cable fixing point is set into rotation about its longitudinal direction, is not loaded at all at the cable fixing point by bendings or reverse bendings.

The rotary mounting can be realized in different ways within the scope of the present invention. The rotary mounting can comprise an axial bearing with a part rotatable about the axis, wherein the cable end fastening is connected with the rotatable part.

The rotary mounting can comprise a pivot mechanism for the axial bearing for alignment of the axis within an angular range. In this case the axial bearing can—since the pivot mechanism enables pivoting of the axial bearing in its entirety—have a rotational axis which is immovable with respect to the axial bearing (i.e., aligned in a predetermined direction). Axial bearings of that kind can be particularly easily realized by standard components, for example axial roller bearings or axial slide bearings. The pivot mechanism can comprise, for example, a joint for pivoting of the axial bearing about a point or a joint for pivoting of the axial bearing about a pivot axis or a joint for pivoting of the axial bearing about a first pivot axis and about a second pivot axis arranged to be non-parallel relative to the first pivot axis. Joints of that kind enable alignment of the axis by pivoting in one dimension about an angle within a predetermined angular range or an alignment of the axis in two dimensions within a predetermined three-dimensional angular range. A joint enabling pivoting in two dimensions has in this connection the advantage that the cable fixing point during mounting does not have to be precisely aligned, since the axis of the rotary mounting is self-aligning with respect to the direction of the tension force within a three-dimensional angular range.

Alternatively, the axial bearing can be designed as an axial pendular bearing, wherein the rotatable part is mounted to be pendular. In this case the rotational axis of the axial bearing is not fixedly aligned with respect to parts of the axial bearing, but is alignable within a predetermined angular range or a three-dimensional angular range. An additional pivot mechanism for pivoting of the axial bearing in its entirety is accordingly not required in this embodiment.

A further embodiment of the cable fixing point according to the present invention comprises means for controlling a torsional moment acting on the cable at the cable end. In this case the cable is indeed rotatably retained at the cable fixing point, but not retained to be freely rotatable. Rotations of the cable can be controlled by the means in such a manner that the cable introduces into the rotary mounting a torsional moment, the magnitude of which lies within predetermined limits. The means can for this purpose comprise, for example, a braking device for braking a rotary movement of the cable and/or a drive for transmission of a torsional moment to the rotatable part and/or to the cable end fastening and/or to the cable. The rotary movements of the cable at the cable fixing point are preferably so controlled that the cable fixing point is held under a twisting-up torsional moment. In this manner it can be achieved that the cable—should it not be free of rotation—does not untwist under the tension loading. Moreover it is ensured that the torsional moment acting on the cable at the cable fixing point does not exceed a predetermined limit. In this way it is possible to also preserve cables which are not free of rotation.

The cable fixing point according to the present invention can be used in an elevator for transporting at least one load carrier by means of at least one cable movable in its longitudinal direction, wherein the cable fixing point serves for fastening a cable end of the respective cable and the respective cable is disposed at the cable end under a tension force, the direction of which is variable in dependence on a position of the load carrier. The construction of the cable fixing point ensures that the axis of the rotary mounting is aligned by the tension force, for example in the respective direction of the tension force and/or in the longitudinal direction of a cable segment adjoining the cable fixing point. Independently of the instantaneous position of the load carrier to be transported the axis of the rotary mounting is automatically so aligned that rotational movements of the cable are controlled in a manner which preserves the cable as far as possible. The cable fixing point does not, during mounting, have to be arranged very precisely, since the axis of the rotary mounting is in any case optimally aligned by the action of the tension force.

The present invention allows guidance of any cables in a preserving manner. It particularly allows preserving guidance of cables which:

have a low stiffness relative to torsions; and/or are laid in such a manner that they are not free of rotation under a tension load; and/or which between the cable fixing points at a guide device are disposed under a diagonal tension and into which particularly large torsional moments can be introduced between the cable fixing points as a consequence of diagonal tension.

DESCRIPTION OF THE DRAWINGS

The above, as well as other advantages of the present invention, will become readily apparent to those skilled in the art from the following detailed description of a preferred embodiment when considered in the light of the accompanying drawings in which.

DESCRIPTION OF THF PREFERRED EMBODIMENT

Figure 1:
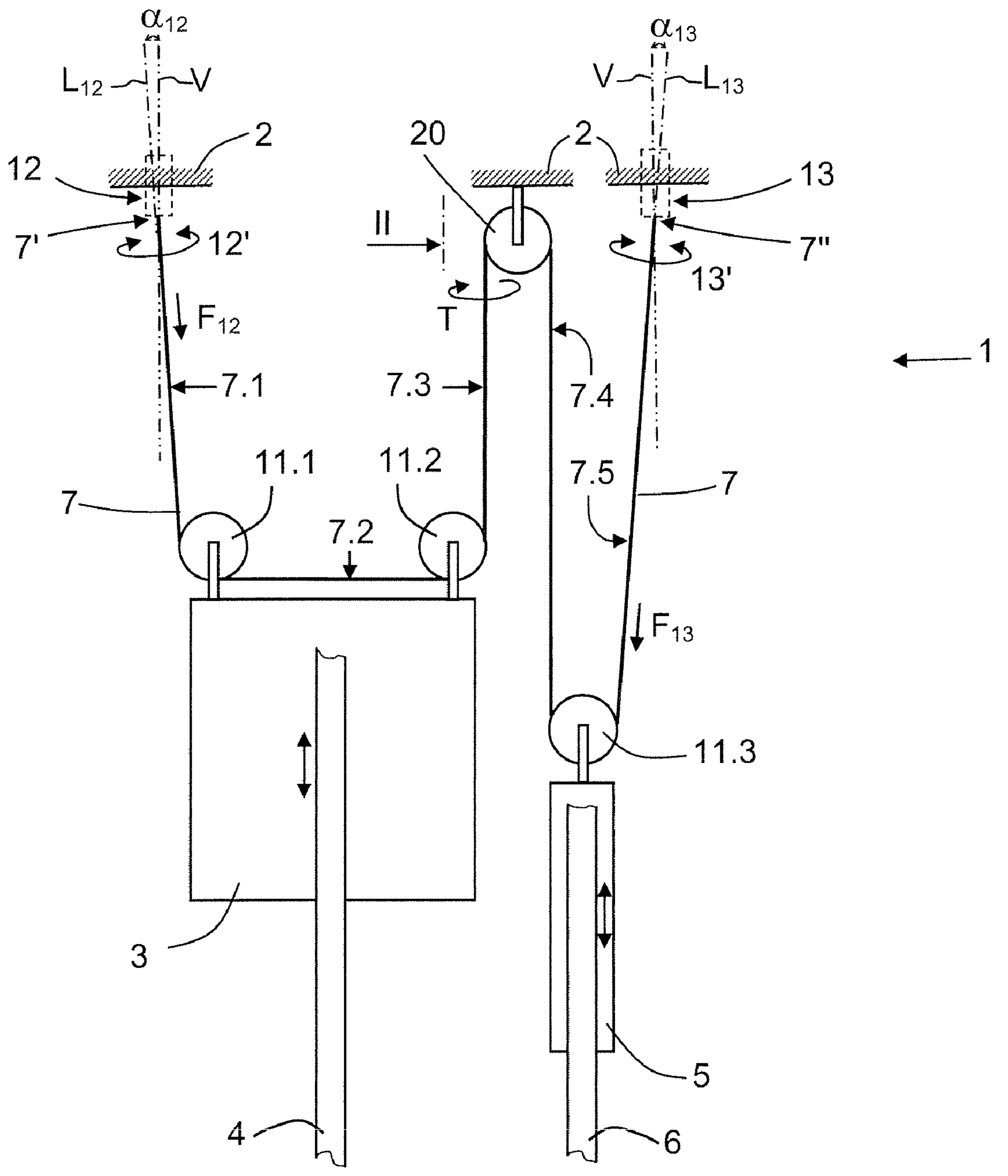
FIG. 1 is a schematic elevation view of an elevator for transporting an elevator car and a counterweight by means of a movable cable, with a drive roller and several deflecting rollers for the cable and two cable fixing points for fastening the cable ends of the cable according to the present invention.

FIG. 1 shows an elevator 1 for transporting at least one load carrier by at least one movable cable connected with the respective load carrier. FIGS. 2 to 7*c* illustrate different details of the elevator 1.

The elevator 1 comprises, in the present case, two load carriers able to be transported by a cable 7, namely an elevator car 3, which is guided in vertical direction at guide rails 4, and a counterweight 5, which is guided at guide rails 6 in vertical direction. The cable 7 has two cable ends 7', 7", which are each arranged at a cable fixing point 12 or 13 to be rotatable about an axis $L_{12}$ or $L_{13}$. The cable 7 can be rotated at the cable fixing points 12 and 13 about the axes $L_{12}$ and $L_{13}$ in each instance in any desired rotational sense, as is indicated in FIG. 1 by double arrows 12' and 13'. The cable fixing points 12 and 13 are fastened to a support structure 2 and are arranged in such a manner that the respective direction of the axes $L_{12}$ and $L_{13}$ deviates from the direction of a vertical V. According to FIG. 1 it is assumed that the axis $L_{12}$ is inclined relative to the vertical V by an angle of inclination $\alpha_{12}$ and the axis $L_{13}$ is inclined relative to the vertical V by an angle of inclination $\alpha_{13}$. Constructional details of the cable fixing points 12 and 13 are not illustrated in FIG. 1; these are explained in the following in conjunction with FIGS. 4 to 7*c*.

The cable 7 is guided over a rotatably mounted drive roller 20, which is arranged at the support structure 2 together with a drive (not illustrated) for the drive roller 20. The cable 7 is additionally guided in the region of the cable segment, which extends between the drive roller 20 and the cable fixing point 12, over two deflecting rollers 11.1 and 11.2 both fastened to the car 3. A 2:1 suspension for the car 3 is thereby realized. The cable 7 is additionally guided in the region of the longitudinal segment, which extends between the drive roller 20 and the cable fixing point 13, over a deflecting roller 11.3 fastened to the counterweight 5. A 2:1 suspension for the counterweight 5 is thereby realized. When the drive roller 20 is set into rotation about its axis of rotation, traction forces are transmitted to the cable 7 and the cable 7 is moved in its longitudinal direction. This has the effect that the cable 7 runs around the deflecting rollers 11.1, 11.2, 11.3 and at the same time the elevator car 3 and the counterweight 7 are moved upwardly and downwardly respectively in opposite sense, depending on the respective rotational direction of the drive roller 20, as indicated in FIG. 1 in each instance by a double arrow at the car 3 and at the counterweight 5.

In the case of travel of the car 3 the drive roller 20 and the deflecting rollers 11.1, 11.2, 11.3 influence the path which the cable 7 follows in the case of its movement in its longitudinal direction. The drive roller 20 and the deflecting rollers 11.1, 11.2, 11.3 thus form a guide device for the cable 7: the regions of the surfaces of the rollers 11.1, 11.2, 11.3 and 20, which come into contact with the cable 7 during travel of the car 3, in that case serve as guide surfaces.

Distinction is made between different cable segments 7.1, 7.2, 7.3, 7.4 and 7.5 of the cable 7 in the following: the cable segment 7.1 extends between the cable end 7' at the cable fixing point 12 and the deflecting roller 11.1; the cable segment 7.2 extends between the deflecting rollers 11.1 and 11.2; the cable segment 7.3 extends between the deflecting roller 11.2 and the drive roller 20; the cable segment 7.4 extends between the drive roller 20 and the deflecting roller 11.3; and the cable segment 7.5 extends between the deflecting roller 11.3 and the cable end 7" at the cable fixing point 13.

In order to keep the car 3 and the counterweight 5 in their respective position, a tension force $F_{12}$ is introduced into the cable fixing point 12 by way of the cable segment 7.1 and a tension force $F_{13}$ is introduced into the cable fixing point 13 by way of the cable segment 7.5. The tension force $F_{12}$ is directed along the longitudinal direction of the cable segment 7.1 and the tension force $F_{13}$ is directed along the longitudinal direction of the cable segment 7.5. During travels of the car 3 the lengths of the cable segments 7.1, 7.3, 7.4 and 7.5 respectively change in correspondence with the instantaneous position of the car 3 and the counterweight 4. The cable fixing points 12 and 13 are arranged in such a manner that the longitudinal direction of the cable segment 7.1 and the longitudinal direction of the cable segment 7.5 are inclined relative to the vertical V and the respective angles between the longitudinal direction of the cable segment 7.1 or the longitudinal direction of the cable segment 7.5 are similarly changed relative to the vertical V during travel of the car 3. Consequently, the tension forces $F_{12}$ and $F_{13}$ change their direction during travel of the car 3.

According to the present invention it is provided that the axis $L_{12}$ can be aligned by the tension force 12 acting on the cable 7 and the axis $L_{13}$ can be aligned by the tension force $F_{13}$ acting on the cable 7. Accordingly, the angles of inclination $\alpha_{12}$ and $\alpha_{13}$ similarly change during travel of the car 3. In the example according to FIG. 1 it is assumed that the axis $L_{12}$ is aligned in the direction of the tension force $F_{12}$ or in the longitudinal direction of the cable segment 7.1. Correspondingly, the axis $L_{13}$ is each time aligned in the direction of the tension force $F_{13}$ or in the longitudinal direction of the cable segment 7.5.

Figure 2:
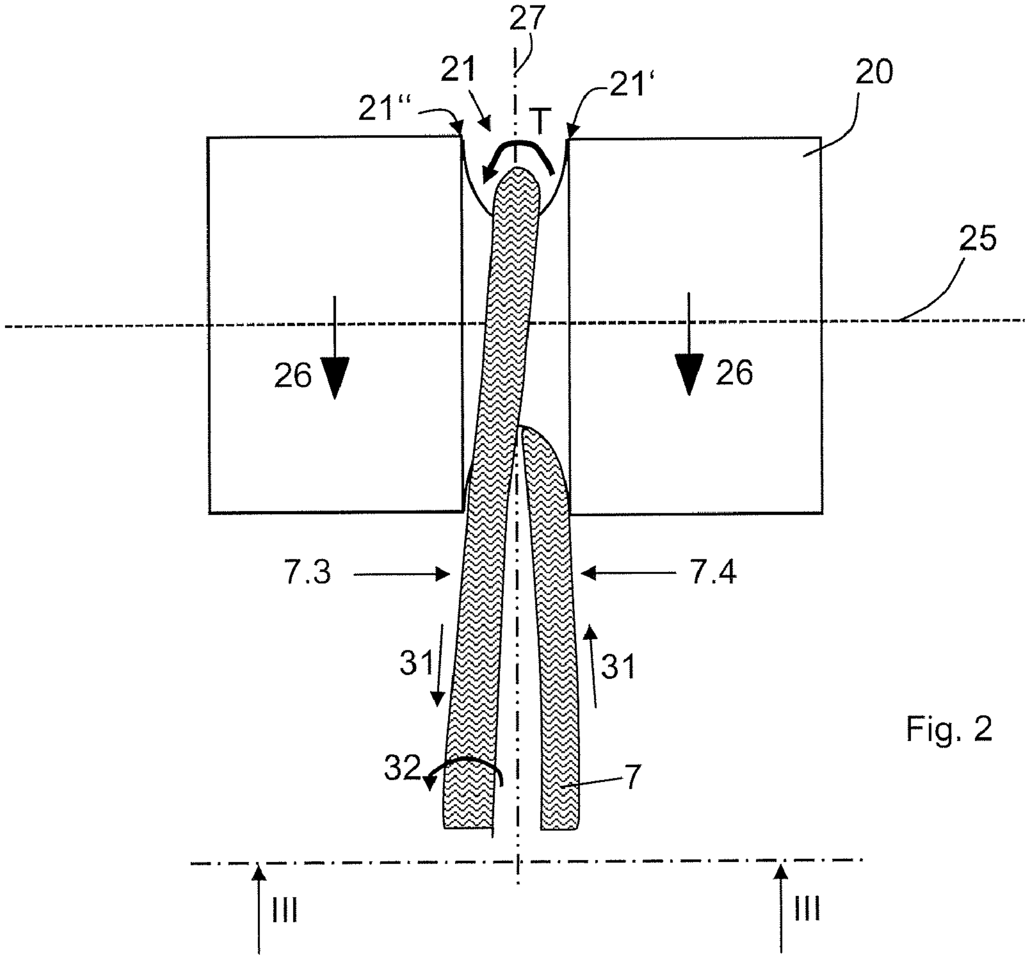
FIG. 2 is an enlarged view of the drive roller taken in the direction of the arrow II in FIG. 1, wherein the cable runs diagonally over the drive roller.
Figure 3:
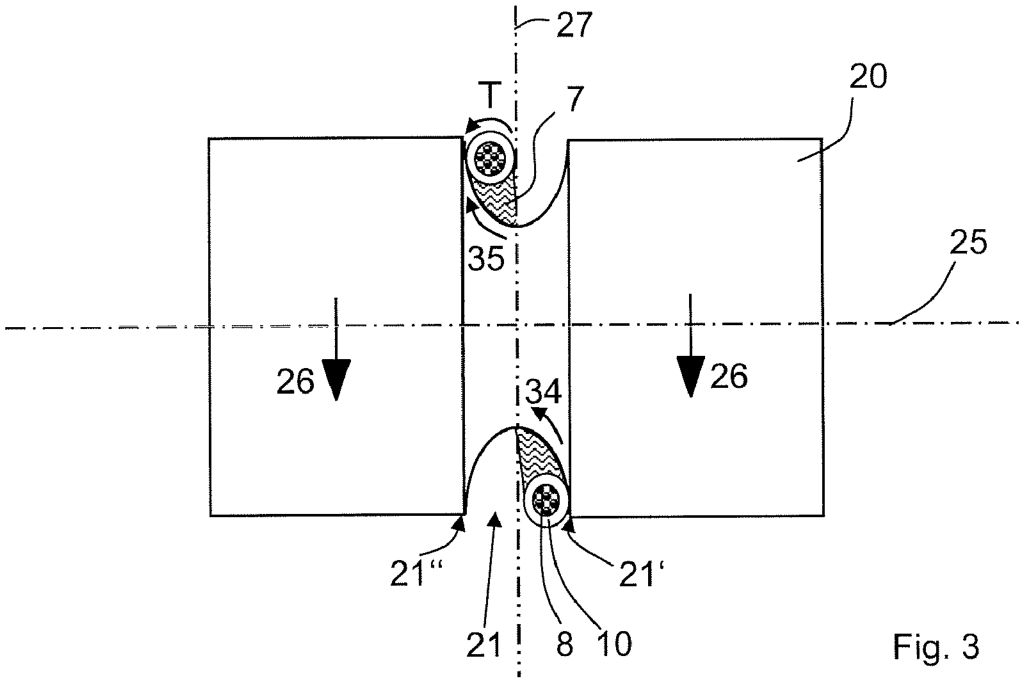
FIG. 3 is a view of the drive roller and cable taken from the direction of the arrow III in FIG. 2.

According to FIGS. 2 and 3 the cable 7 is guided in such a manner that in the case of travel of the car 3 it is moved not only in its longitudinal direction, but is also caused to make a rotational movement about its longitudinal direction.

The course of the cable 7 in the vicinity of the drive roller 20 is illustrated in a detailed manner in FIGS. 2 and 3. FIG. 2 in that case shows an elevation in the direction of the arrow II in FIG. 1, i.e. in the horizontal direction, and FIG. 3 shows an elevation in the direction of the arrow III in FIG. 2, i.e. in the vertical direction from below to above. It is assumed that the cable 7 has a round cross-segment and is guided in a groove 21 at the surface of the drive roller 20. The groove is arranged symmetrically with respect to a plane 27 oriented perpendicularly to an axis 25 of rotation of the drive roller 20. The position of the base of the groove 21 is defined by the line of intersection between the plane 27 and the drive roller 20.

FIGS. 2 and 3 illustrate the drive roller 20 in a state of a rotation about the axis 25. In the present example it is assumed that the respective surface of the drive roller 20 facing the observer is instantaneously moved in the direction of an arrow 26. By virtue of the rotation of the drive roller 20 the cable 7 is moved in its longitudinal direction, i.e. in the direction of an arrow 31, and guided along the surface of the drive roller 20 through the groove 21. Moreover, it is assumed that the cable 7—due to the relative arrangement of the drive roller 20 or the groove 21 with respect to the deflecting rollers 11.1, 11.2, 11.3 at the elevator car 3 and the counterweight 5—is guided not exactly parallel to the plane 27. Under this precondition the cable 7—influenced by the tension forces acting on the cable 7—is disposed in contact with the drive roller 20 along a curve extending obliquely with respect to the plane 27. In other words: in the present configuration the cable 7 is disposed under diagonal tension. In the situation illustrated in FIGS. 2 and 3 the cable 7 runs, at the uppermost point of its path, at the base of the groove 21, i.e. in the middle between the adjoining flanks of the groove 21, and there intersects the plane 27 (see FIG. 2). As can be further inferred from FIGS. 2 and 3, the part (in the region of the cable segment 7.4) of the cable 7 running upwardly in the direction towards the support structure 2 (i.e. running on the roller 20 or running into the groove 21) of the cable 7 impinges at an edge 21' of the groove 21 on the surface of the drive roller 20 and approaches the plane 27 on one flank of the groove 21, as is indicated by an arrow 34 (FIG. 3). The part (in the region of the cable segment 7.3) running downwardly away from the support structure 2 (i.e. running away from the roller 20 or running out of the groove 21) of the cable 7 goes away from the plane 27 and, on the other flank of the groove 21, approaches the edge 21" of the groove 21, as is indicated by an arrow 35 (FIG. 3).

In the example according to FIGS. 2 and 3 it is assumed that the coefficient of friction for contact between the cable 7 and the drive roller 20 is of such a magnitude that the cable 7 cannot slide in the direction of the axis 25 of rotation or in the direction of the arrows 34 and 35 without resistance. This assumption is compatible with the requirement that substantial traction forces have to be transferred by the drive roller 20, in correspondence with its function in the elevator 1, to the cable 7. In the present case the movement of the cable 7 longitudinally indicated by the arrows 34 and 35—depending on the respective magnitude of the coefficient of friction for contact between the cable 7 and the drive roller 20—is connected with a rolling motion or a superimposition of a rolling motion and a sliding motion. The rolling motion in the present case is promoted by the round form of the cross-segment of the cable 7. Moreover, the rolling motion is promoted by the fact that the cable 7 is guided in non-positive manner at the base of the groove 21. Due to the rolling motion the cable 7 is rotated about its longitudinal direction. The direction of the rotation is indicated in FIG. 2 by an arrow 32.

In the case of the situation illustrated in FIGS. 2 and 3 the rotation of the cable 7 in the direction of the arrow 32 is attributed to the fact that a torsional moment T is introduced into the cable 7 at the drive roller 20. The instantaneous direction of the torsional moment T is indicated in FIGS. 1 to 3 by respective arrows. The direction of the torsional moment T can be reversed relative to the indicated arrows if the drive roller 20 rotates about the axis 25 of rotation opposite to the direction of the arrows 26.

In the case of FIGS. 2 and 3 the effect of a diagonal tension on the cable 7 is illustrated, by way of example, with reference to the drive roller 20. It should be noted that the illustrated technical interrelationships are transferable in analogous manner to the movement of the cable 7 at the deflecting rollers 11.1, 11.2 and 11.3 insofar as a diagonal tension should also be realized at one of these rollers. Moreover, it may be emphasized that the presence of the groove 21 is not an essential precondition for occurrence of the rotation 32. A sufficient condition for occurrence of rotation of the cable 7 is the presence of diagonal tension. In general the cable 7 is disposed under diagonal tension when the cable 7 is guided in such a manner that in the case of movement in its longitudinal direction in contact with the rollers 11.1, 11.2, 11.3 and 20 it is moved at least in segments in the direction of one of the axes of rotation of the rollers 11.1, 11.2, 11.3 and 20 (i.e. not exclusively in a plane perpendicular to the axis of rotation of the respective roller).

If the cable 7 in the case of rotation of the drive roller is rotated at the drive roller 20 about its longitudinal direction then this rotation as a rule does not act uniformly over the entire length of the cable 7. The cable 7 is not, in fact, freely rotatable over the entire length, especially since rotation of the cable 7 about its longitudinal direction is restricted at several locations, for example at the deflecting rollers 11.1, 11.2, 11.3 due to friction between the cable 7 and the deflecting rollers 11.1, 11.2, 11.3 and in certain circumstances—as is explained in the following—also at the cable fixing points 12 and 13. Moreover, further torsional moments can be introduced into the cable at the deflecting rollers 11.1, 11.2 and 11.3 independently of whether or not the cable 7 is also disposed under a diagonal tension at these rollers. Consequently, in the case of travel of the car 3 the cable segment 7.1, 7.2, 7.3, 7.4 and 7.5 can be rotated.

The latter applies even when the cable 7 is not disposed under diagonal tension at the deflecting rollers 11.1, 11.2 and 11.3. If the cable 7 is disposed under diagonal tension exclusively at the drive roller 20 and the drive roller 20 is set into rotation in the case of travel of the car 3 then initially twistings can be introduced at the drive roller 20 directly into the cable segments which adjoin the drive roller 20, i.e. into the cable segment 7.3 and 7.4. These twistings introduced at the drive roller 20 can, in the case of travel of the car 3, indirectly lead to twistings in further cable segments between the two cable fixing points, since when the cable 7 runs around the deflecting rollers 11.1, 11.2 and 11.3 twistings can also be passed on by way of the rollers 11.2 and 11.3, i.e. into the cable segments 7.1, 7.2 and 7.5. This applies particularly when the car 3 is caused to repeatedly travel upwardly and downwardly. The magnitude of the twistings of the individual cable segments can be different in each instance. In addition, the magnitude of the twisting of the respective cable segment in the case of travel of the car 3 can be varied as a function of the instantaneous length of the cable segment.

In general, the magnitude of twistings able to be introduced into the cable 7 due to interaction of the cable 7 with the rollers 11.1, 11.2, 11.3 and 20 depends on several factors a)-c):

a) on the respective coefficients of friction for the contacts of the cable 7 with the rollers 11.1, 11.2, 11.3 and 20, b) on the torsional stiffness of the cable 7, c) on the "magnitude" of the diagonal tension at each individual roller, for example characterized by the angle between the axis of rotation of the respective roller and the respective course of the longitudinal direction of the cable 7 along the surface of the respective roller (if this angle is equal to 90° at all places at which the cable 7 is brought into contact with the roller then no diagonal tension is present, i.e. the cable 7 moves at the surface of the roller within a plane perpendicular to the axis of rotation of the roller; the more this angle in a selected length segment of the cable 7 at the surface of the roller departs from 90°, the more strongly pronounced is the diagonal tension in this length segment).

As indicated by the cross-sections of the cable 7 illustrated in FIG. 3 the cable 7 comprises several tensile carriers 8, which are stranded together, and a cable casing 10, which encloses the tensile carriers 8 and forms the surface of the cable 7. The tensile carriers can comprise, for example, synthetic fibers (for example of aramid) and/or metallic wires (for example, steel wires) and/or natural fibers. The fibers and/or wires can each time be processed to form strands. The cable casing 10 can be made of an elastomer, for example of polyurethane or rubber.

The cable 7 can—furnished with the aforesaid characteristics—be twisted particularly easily.

The cable 7 has a load torsional stiffness when the tensile carriers are made of, for example, synthetic fibers such as aramid.

Elastomers such as polyurethane or rubber as material for the cable casing 10 respectively ensure a high level of friction between the cable casing 10 and the drive roller 20 or the deflecting rollers 11.1, 11.2 and 11.3. This in turn leads to a high level of traction between the drive roller 20 and the cable 7. On the other hand, extremely large torsional moments can be introduced into the cable 7 at the rollers 20, 11.1, 11.2 and 11.3 when the cable is disposed under diagonal tension.

The present invention makes it possible to preserve the cable 7 in that the amount of twisting of the cable segment 7.1 and/or the amount of twisting of the cable segment 7.5 is kept within limits by a suitable construction of the cable fixing points 12 and 13.

FIGS. 4 to 7*c* illustrate three different embodiments of the fixing points 12 and 13. The embodiments each comprise a cable end fastening 50 for the cable end 7' or 7" of the cable 7 and a rotary mounting 40 or 60 or 100 for a cable end fastening 50.

Figure 4:
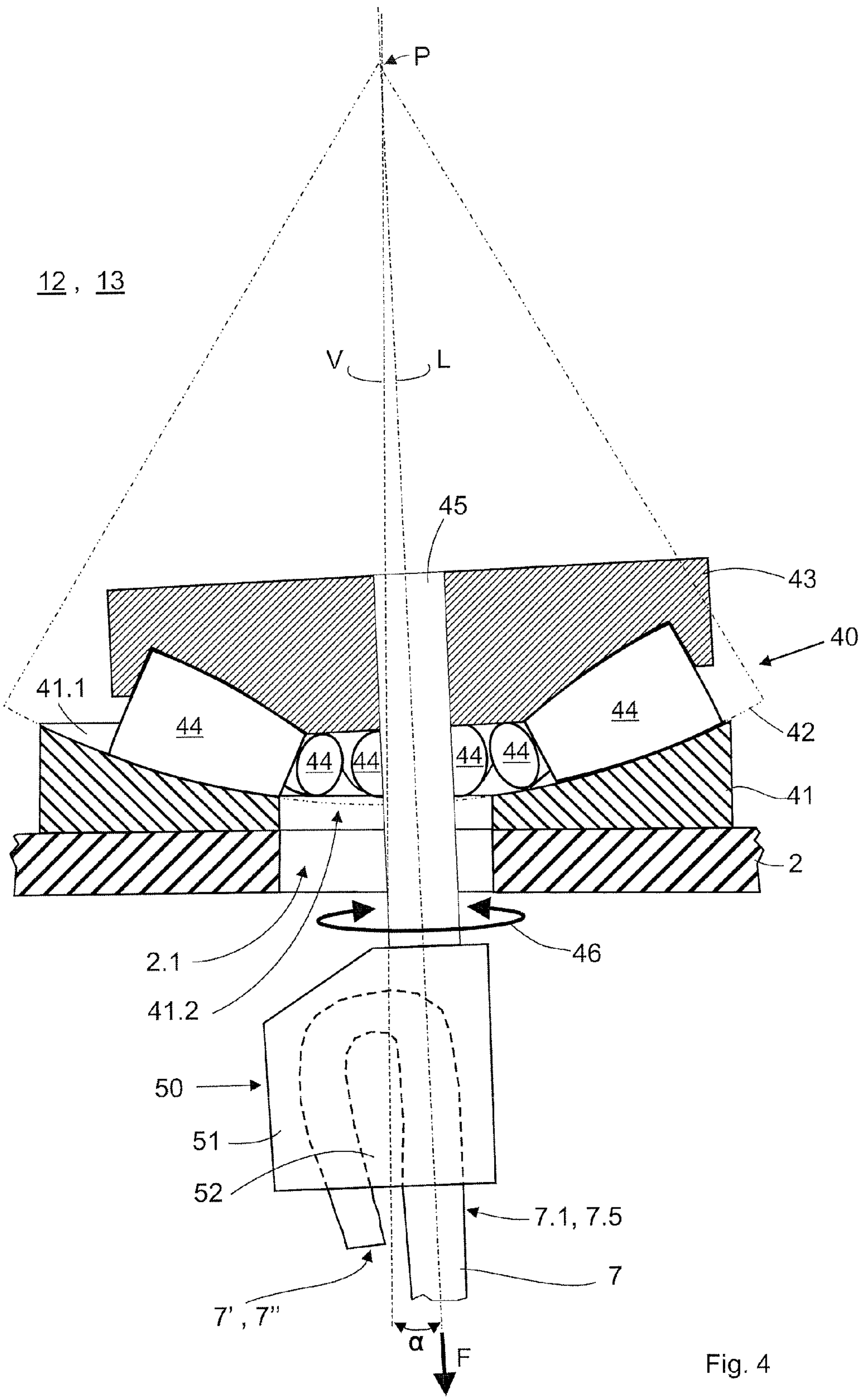
FIG. 4 is a schematic elevation view in partial section of a first embodiment of a cable fixing point according to the present invention.
Figure 5:
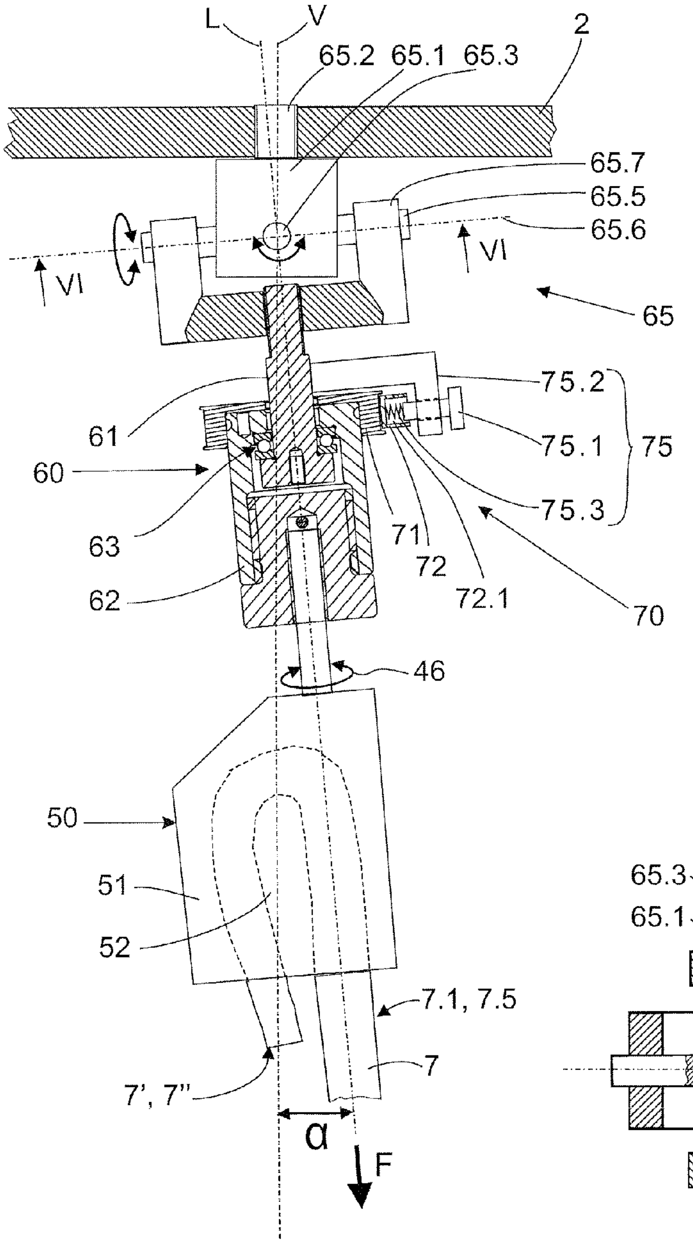
FIG. 5 is a schematic elevation view in partial section of a second embodiment of a cable fixing point according to the present invention.

The cable 7 is retained at the cable end 7' or 7" in conventional manner by means of the cable end fastening 50. For this purpose a longitudinal segment (depicted in FIGS. 4, 5, 7*a* and 7*b* by dashed lines) of the cable 7 is clamped in the vicinity of the cable end 7' or 7" between a housing part 51 and a wedge 52 of the cable end connection 50. The rotary mounts 40, 60 and 100 enable—in respectively different manner—rotation of the respective cable end connection 50 about an axis L which is pivotable and adopts each time a direction depending on the direction of a tension force F acting on the cable 7. The symbol "L" is here used to stand for the axis $L_{12}$ or the axis $L_{13}$. The axis L is illustrated in FIGS. 4, 5 and 7*a* as a dot-dashed line. The symbol "F" is here used to stand for the tension force $F_{12}$ introduced by way of the cable segment 7.1 into the cable fixing point 12 or for the tension force $F_{13}$ introduced by way of the cable segment 7.5 into the cable fixing point 13. The rotary mounts 40, 60 and 100 are each so constructed that the respective axis L can align with the respective direction of the tension force F. The instantaneous direction of the tension force F is indicated in FIGS. 4, 5 and 7*a* by an angle α with respect to the vertical V, which is illustrated as a dash-and-double-dotted line. The symbol "α" stands for the angle of inclination $\alpha_{12}$ or the angle of inclination $\alpha_{13}$.

The first embodiment of the cable fixing point 12 or 13 according to FIG. 4 comprises the cable end fastening 50 for the cable end 7' or 7" and the rotary mounting 40, wherein the rotary mounting 40 comprises:

an axial bearing in the form of an axial pendular bearing with a base 41, which can be supported on the support structure 2, and with a part 43 which is rotatable about the axis L and which is supported on a surface 41.1 of the base 41 by way of several roller bearings 44, and a fastening 45 for fastening the cable end fastening 50 to the rotatable part 43.

The surface 41.1 has the form of a segment of a ball surface. In FIG. 4 a point P characterizes the center point of a circle of curvature 42 which is matched to the surface 41.1. Each of the roller bodies 44 has the form of a dancer roller, the circumferential surface of which adjoining the surface 41.1 has within a longitudinal segment along the respective center axis (not illustrated in FIG. 4) the same curvature as the surface 41.1. The center axes of the different roller bodies 44 are oriented in a star shape to the axis L.

The fastening 45 in the present case is of rod-shaped construction and arranged in such a manner that the tension force F acting in longitudinal direction of the cable segment 7.1 or 7.5 can be introduced along the axis L into the rotatable part 43. For this purpose the fastening 45—as illustrated in FIG. 4—is led through a passage opening 2.1 in the support structure 2, a central passage opening 41.2, which is aligned with the passage opening 2.1, in the base 41 and a space formed between the roller bodies 44 and the rotatable part 43.

The rotatable part 43 is mounted on the roller bodies 44 and the surface 41.1 to be pendular with respect to the point P. Thanks to the spherical form of the surface 42.1 and the aforesaid shape and arrangement of the roller bodies 44 the rotatable part 43 can, on the one hand, be rotated about the axis L when a rotary movement is transmitted by way of the cable 7 to the cable end fastening 50, as indicated in FIG. 4 by a double arrow 46. On the other hand, the rotatable part 43 and thus the axis L can be pivoted about the point P insofar as the friction between the roller bodies 44 and the surface 41.1 is of such a small amount that the roller bodies 44 can slide sufficiently satisfactorily radially relative to the axis L. The friction between the roller bodies 44 and the surface 41.1 can usually be selected to be of such a small amount that the rotatable part 43 adopts, under the action of the tension force F, a setting characterized by the fact that the tension force F is directed along a straight line through the point P. In this setting the rotatable part 43 is loaded exclusively along the axis L, i.e. axially. Since in this setting there is no force acting in a radial direction with respect to the axis L, the axis L under this precondition is disposed in a stable position of equilibrium. If the direction of the tension force F changes, then the rotatable part 43 moves like a pendulum about the point P until the axis L has again adopted an equilibrium position in which no force acts radially with respect to the axis L. In this manner it is ensured that the axis L is oriented in each instance in the direction of the tension force F and in the longitudinal direction of the cable segment 7.1 or the cable segment 7.5.

Figure 6:
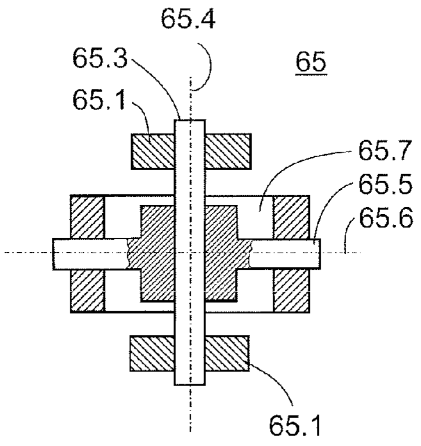
FIG. 6 is a cross-sectional view of the cable fixing point taken along the line VI-VI in FIG. 5.

The second embodiment of the cable fixing point 12 or 13 according to FIGS. 5 and 6 comprises the cable end fastening 50 for the cable end 7' or 7", the rotary mounting 60 for the cable end fastening 50 and a braking device 70.

The braking device 70 serves—as further explained in the following—for controlling a rotary movement of the cable 7 or for controlling a torsional moment acting on the cable 7 at the cable fixing point 12 or the cable fixing point 13.

The rotary mounting 60 comprises:

a base 61, a pivot mechanism 65 which is fastened to the support structure 2 and to which the base 61 is fastened so as to enable pivoting of the base 61 relative to the vertical V, and a part 62 which is rotatable about the axis L and which is supported by way of an axial bearing 63 on the base 61 in such a manner that the axis L is fixedly arranged with respect to the base 61.

The cable end fastening 50 is fastened to the rotatable part 62 and can thus be similarly rotated about the axis L when a rotary movement is transmitted to the cable end fastening 50 by way of the cable 7, as indicated in FIG. 5 by the double arrow 46.

The axial bearing 63 is illustrated in FIG. 5 as a roller bearing. A corresponding function can obviously also be achieved by the kinds of axial bearings, for example by slide bearings.

The pivot mechanism 65 is constructed, according to FIGS. 5 and 6, as a cardan joint and enables pivoting of the base 61 and thus the axis L about two intersecting axes 65.4 and 65.6. The pivot mechanism 65 comprises:

a support 65.1 for a first shaft 65.3 rotatable about the axis 65.4, a fastening 65.2 for fastening the support 65.1 to the support structure 2, a second shaft 65.5 which is seated on the shaft 65.3 and rotatable about the axis 65.4 and which is arranged along the axis 65.6, and a support 65.7, which is rotatably arranged on the second shaft 65.5, for the base 61.

The base 61 is fastened to the support 65.7 in such a manner that the axis L can pivot not only about the axis 65.4, but also about the axis 65.6, i.e. in two dimensions (as is indicated in FIG. 5 by means of double arrows at the axes 65.4 and 65.6). The axis L is arranged in such a manner that the axes L, 65.4 and 65.6 intersect at a common intersection point (as illustrated in FIGS. 5 and 6). The axis L can accordingly move like a pendulum about the point of intersection of the axes 65.4 and 65.6.

The cable end fastening 50 is fastened to the rotatable part 62 of the rotary mounting 60 in such a manner that the rotary mounting 60 adopts a stable equilibrium position when the tension force F is introduced along the axis L—i.e. axially—into the rotary mounting 60. If the direction of the tension force F or the angle α changes, the axis L is then pivoted about the axes 65.4 and 65.6 or the point of intersection of the axes 65.4 and 65.6 until the axis L again adopts a new equilibrium position in such a manner that the axis L is aligned with the direction of the tension force F. The rotary mounting 60 can always adopt the respective equilibrium position insofar as the friction between the support 65.1 and the shaft 65.3 and/or the friction between the shaft 65.5 and the support 65.7 is sufficiently small. As a rule the friction between the components of the pivot mechanism 65 can be selected so that the axis L is aligned in the direction of the tension force F or in the longitudinal direction of the cable segment 7.1 or the longitudinal direction of the cable segment 7.5.

A rotational movement of cable 7 at the cable fixing point 12 or at the cable fixing point 13 can be braked by means of the braking device 70. The braking device 70 comprises:

a brake drum 71 which is rigidly connected with the rotatable part 62 and arranged in such a manner that the brake drum 71 rotates about its center axis on each occasion where the rotatable part 62 is rotated about the axis L;

a brake shoe 72 which can be brought into contact with the outer side of the brake drum 71 so as to load the brake drum 71 with a predetermined braking force "$F_B$" and in a given case to brake a rotary movement of the rotatable part 62; and a control device 75 for controlling the braking force $F_B$.

The control device 75 comprises:

a setting screw 75.1, a holder 75.2 for the setting screw 75.1, wherein the holder 75.2 is fixed to the base 61 of the rotary mount 60 and the setting screw 75 is guided in its longitudinal direction in a threaded bore provided in the holder 75.2, and a spring 75.3 disposed in contact with the brake shoe 72 and an end, which faces the brake shoe 72, of the setting screw 75.1.

The brake drum 71, brake shoe 72, setting screw 75.1 and spring 75.3 co-operate as follows. The setting screw 75.1 serves not only for guidance of the brake shoe 72, but also for controlling the braking force $F_B$ acting on the brake drum 71. In order to ensure guidance of the brake shoe 72, the brake shoe 72 is furnished at the side remote from the brake drum 71 with a bore 72.1 which is so arranged that a longitudinal segment of the setting screw 75.1 protrudes into the bore 72.1, and the diameter thereof is so matched to the dimensions of the setting screw 75.1 that the brake shoe 72 is guided in the longitudinal direction of the setting screw 75.1 with some degree of play. The spring 75.3 is so arranged in the bore 72.1 that the length of the spring 75.3 can be changed, by adjusting the setting screw 75.1, in order to tension the spring 75.3 and produce a spring force acting in the longitudinal direction of the spring 75.3. The brake shoe 72 is pressed against the brake drum 71 by this spring force. Through adjustment of the setting screw 75.1 in its longitudinal direction the braking force $F_B$ acting on the brake drum 71 can accordingly be varied and thus controlled.

The braking device 70 can be operated as follows:

If the setting screw 75.1 is adjusted so that the spring 75.3 is not tensioned and the brake drum 71 consequently is not braked, then the rotatable part 62 can freely follow every rotational movement of the cable segment 7.1 or the cable segment 7.5 about the axis L. In this case no torsional moment acts on the rotatable part 62.

If the setting screw 75.1 is set so that the brake drum 71 is loaded by a braking force $F_B$, then the braking force $F_B$ establishes an upper limit $T_{max}(F_B)$ for a torsional moment able to act on the rotatable part 62.1 with respect to the axis L without the rotatable part 62 being rotated relative to the base 61. $T_{max}$ is greater than the braking force $F_B$. If a torsional moment having a value exceeding $T_{max}$ acts on the rotatable part 62 the braking force can be overcome and the rotatable part 62 rotated relative to the base 61. Through loading of the brake drum 71 with the predetermined braking force $F_B$ the cable segment 7.1 or the cable segment 7.5 can be kept under the predetermined torsional moment $T_{max}$.

The braking device 75 can be used as follows to control the torsional moment acting on the cable segment 7.1 at the cable fixing point 12 or the torsional moment acting on the cable segment 7.5 at the cable fixing point 13. If the cable 7 is free of rotation then it is advantageous if the brake drum 71 is not loaded by means of the braking device 75 with a braking force ($F_B$=0). Since the cable in accordance with this assumption is free of rotation, it cannot be twisted solely under the action of a tension force. Twistings or torsional moments which can be introduced into the cable between the cable fixing points 12 and 13 in the case of transport of the load carriers of the elevator do not excessively load the cable, since the cable 7 is retained at the cable fixing points 12 and 13 to be freely rotatable. If, however, the cable 7 is not free of rotation and is retained at the cable fixing points 12 and 13 to be freely rotatable, the cable untwists under the action of the tension force F, which acts on the cable, even when the load carrier of the elevator is not transported and accordingly no twistings or torsional moments are introduced into the cable 7 between the cable fixing points 12 and 13. If the cable 7 is not free of rotation, untwisting of the cable 7 can be prevented by means of the braking device 70 in that the brake drum 71 is loaded by a braking force ($F_B$>0) and the cable segment 7.1 or 7.5 is kept under a predetermined torsional moment. The torsional moment can be selected so that untwisting of the cable is prevented. The braking force is preferably so selected that the cable segment 7.1 at the cable fixing point 12 or the cable segment 7.5 at the cable fixing point 13 is held under a twisting-up torsional moment. The torsional moment can be limited so that the cable 7 is not excessively loaded. In this manner the cable 7 can be held in preserving manner even when, due to its construction, it is not free of rotation.

The braking device 75 according to FIG. 5 can be modified in numerous ways within the scope of the present invention. For example the magnitude of the braking force $F_B$ could be variable and/or controllable by electronic means. Alternatively, also other parts, which are moved in the case of rotational movement of the cable 7, could be loaded with the braking force $F_B$, for example the cable segment 7.1 or the cable segment 7.5 and/or the cable end fastening 50.

Figure 7C:
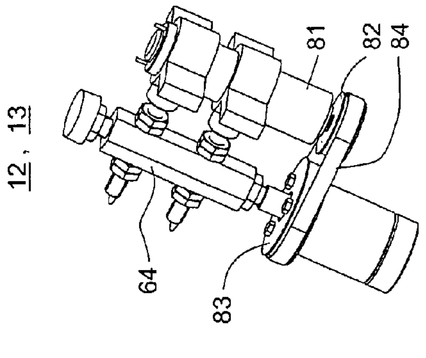
FIG. 7*c* is a perspective view of the cable fixing point shown in FIG. 7*b*.
Figure 7B:
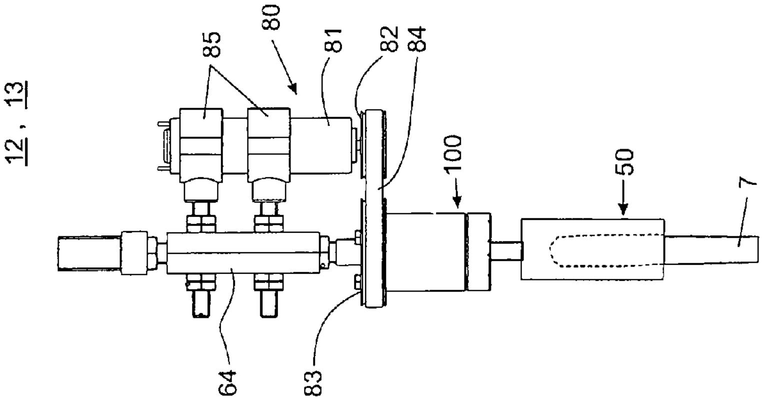
FIG. 7*b* is a side elevation view of the cable fixing point shown in FIG. 7*a*.
Figure 7A:
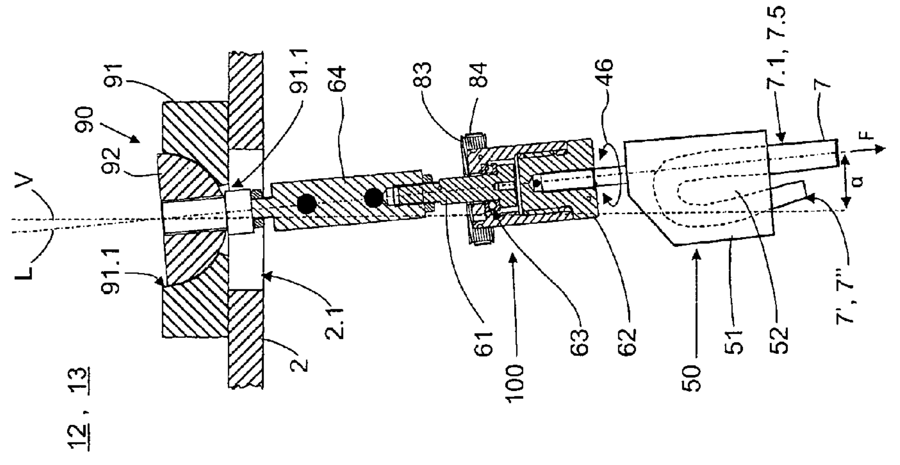
FIG. 7*a* is a schematic elevation view in partial section of a third embodiment of a cable fixing point according to the present invention.

The third embodiment of the cable fixing point 12 or 13 according to FIGS. 7*a* through 7*c* comprises the cable end fastening 50 for the cable end 7' or 7'', the rotary mounting 100 for the cable end fastening 50 and a drive 80. The drive 80 and parts of the rotary mounting 100 are illustrated in FIGS. 7*a*-7*c* in three different perspectives.

The drive 80 serves—as explained in the following—for controlling a rotational movement of the cable 7 or for controlling a torsional moment acting on the cable 7 at the cable fixing point 12 or at the cable fixing point 13.

The rotary mount 100 comprises:

the base 61, a pivot mechanism 90 which is fastened to the support structure 2 and to which the base 61 is fastened so as to enable pivoting of the base 61 relative to the vertical V, the part 62 which is rotatable about the axis L and which is supported by way of the axial bearing 63 on the base 61 in such a manner that the axis L is fixedly arranged relative to the base 61.

The cable end fastening 50 is fastened to the rotatable part 62 and can thus similarly rotate about the axis L when a rotational movement is transmitted to the cable end fastening 50 by way of the cable 7, as is indicated in FIG. 7*a* by the double arrow 46.

The axial bearing 63 is illustrated in FIG. 7*a* as a roller bearing. A corresponding function can obviously also be achieved by other kinds of axial bearings, for example by slide bearings.

The pivot mechanism 90 is constructed, according to FIG. 7*a* as a ball joint and enables pivoting of the base 61 and thus the axis L. The pivot mechanism 90 comprises:

a ball socket 91 with a spherical support surface 91.1, a ball part 92 rotatably mounted on the support surface 91.1 and a fastening 64 for fastening the base 61 to the ball part 92.

The ball socket 91 is arranged on the support structure 2 in such a manner that the ball socket 91 is supported at the periphery of the passage opening 2.1 formed in the support structure 2. The fastening 64 is of rod-shaped construction and fastened to the ball part 92 in such a manner that the fastening 64 is arranged along the axis L and projects through an opening 91.2 at the base of the ball socket 91 and the passage opening 2.1. Due to the shape of the ball socket 91, the axis L is pivotable about the center of curvature of the support surface 91.1 in two dimensions.

The cable end fastening 50 is fastened to the rotatable part 62 of the rotary mounting 100 in such a manner that the ball part 92 and thus the base 61 can adopt a stable position of equilibrium each time the tension force F is introduced into the rotary mounting 100 along the axis L, i.e. axially. If the direction of the tension force F or the angle $\alpha$ is changed, then the axis L is pivoted about the center of curvature of the support surface 91.1 until the axis L again adopts a new equilibrium position in such a manner that the axis L aligns with the direction of the tension force F. The rotary mounting 100 can always adopt the respective equilibrium position insofar as the friction between the ball part 92 and the ball socket 91 is sufficiently small. As a rule the friction between the ball part 92 and the ball socket 91 can be selected so that the axis L is aligned in the direction of the tension force F and/or in the longitudinal direction of the cable segment 7.1 or the longitudinal direction of the cable segment 7.5.

The drive 80 is fastened to the fastening 64 by means of a holder 85. It is constructed as a belt drive and serves for the transmission of a torsional moment to the rotatable part 62 of the rotary mounting 100. The drive 80 comprises a motor 81 (for example, drivable by electrical means), a (driving) belt pulley 82 seated on a drive shaft of the motor 81, a (driven) belt pulley 83 fastened to the rotatable part 62, a (endless) belt 84 spanning the belt pulleys 82 and 83 and a regulating device (not illustrated in FIGS. 7*a*-7*c*) for regulating the torque transmissible by the motor 81 to the belt pulley 82.

It can be achieved by appropriate control of the motor 81 that the rotatable part 62 of the rotary mounting 100 rotates relative to the base 61. In this manner the amount of twisting of the cable segment 7.1 or of the cable segment 7.5 can be actively controlled by a suitable drive control of the motor 81. In operation the drive 80 is so regulated by means of the regulating device that the cable segment 7.1 at the cable fixing point 12 or the cable segment 7.5 at the cable fixing point 13 is disposed under a torsional moment which is so directed that it acts in twisting-up sense on the cable segment 7.1 or on the cable segment 7.5 and the magnitude of which is so limited that the cable 7 is not damaged. In this manner the cable segment 7.1 or the cable segment 7.5 can be kept under a twisting-up torsional moment. The drive 80 can be so regulated, for example, that the torsional moment acting on the cable segment 7.1 or the torsional moment acting on the cable segment 7.5 is constant during operation of the elevator 1. In this manner compensation can be provided for the rotations, which cause untwisting and which in certain circumstances are introduced into the cable segment 7.1 or into the cable segment 7.5 due to the diagonal tension at the drive roller 20 or at the deflecting rollers 11.1, 11.2 and 11.3, by corresponding rotations in opposite sense which can be introduced by means of the drive 80 into the cable segment 7.1 at the cable fixing point 12 or into the cable segment 7.5 at the cable fixing point 13.

The drive 80 can be modified in various ways within the scope of the invention. It does not necessarily have to be constructed as a belt drive. The described functions of the drive 80 can also be realized by other principles known from drive technology. According to a further variant the drive 80 can be so arranged that the rotatable part 62 and/or the cable segment 7.1 or 7.5 and/or the respective cable end connection 50 can be loaded by a torsional moment in order to keep the cable segment 7.1 or the cable segment 7.5 under a torsional moment acting in twisting-up sense.

It is also possible to replace the drive 80 according to FIGS. 7*a*-7*c* by a space-saving variant. It is, for example, possible to suitably integrate a motor in the rotary mounting 100. For this purpose, the base 61 and the rotatable part 62 of the rotary mounting 100 can be so designed that sufficient space for receiving a motor (with or without transmission), by which a torsional moment is transmissible to the rotatable part 62, and optionally sufficient space for a suitable control means for the motor result between the base 61 and the rotatable part 63.

The elevator car 3 and the counterweight 5 can also be suspended at several cables 7 which can, for example, be guided over the drive roller 20 and the deflecting rollers 11.1, 11.2 and 11.3. In this case the cable fixing points 12 and 13 can be appropriately modified: the cable ends of the additional cables can—like the cable 7—in each instance be fastened by way of a cable end connection 50 and the rotary mounting 40 or 60 or 100 to the support structure 2 and in the case of need, as shown in FIGS. 5 and 7*a*, be equipped with the braking device 70 or with the drive 80. The different cables can be influenced to different extent by diagonal tension at the drive roller 20 and the deflecting rollers. Accordingly, it can be expedient to keep the different cables at the respective cable ends under torsional moments of different magnitude according to the circumstances of the respective individual case. Moreover, the cable end connections 50 can be so arranged in the respective rotary mountings that they are mounted to be movable along the respective axis L against the restoring force of a spring.

The rotary mountings 40, 60 and 100 can equally be modified within the scope of the invention. In place of the pivot mechanisms 65 and 90 there can be used any desired pivot mechanism which allows automatic orientation of the axis L in a direction which is dependent on the direction of the tension force introduced into the respective rotary mounting.

In accordance with the provisions of the patent statutes, the present invention has been described in what is considered to represent its preferred embodiment. However, it should be noted that the invention can be practiced otherwise than as specifically illustrated and described without departing from its spirit or scope.

What is claimed is:

1. An elevator having a cable fixing point for fastening at least one cable for transporting at least one load carrier comprising:

a cable end fastening for attachment to a cable end of the cable; and a rotary mounting connected to said cable end fastening and adapted to be attached to a support structure, whereby when said cable end fastening is attached to the cable end and said rotary mounting is attached to the support structure, said rotary mounting enables rotation of said cable end fastening about an axis in a longitudinal direction of the cable that can be aligned by a tension force acting on the cable wherein said force is exerted by the load carrier; and means for control of a torsional moment acting about the longitudinal axis on the cable at the cable end, said means for control being connected to said rotary mounting, wherein said means for control includes a drive for transmission of a torsional moment to the cable.

2. The cable fixing point according to claim 1 wherein said rotary mounting permits the axis to be aligned in a direction of the tension force acting on the cable and/or in a longitudinal direction of a segment of the cable that adjoins said cable fixing point.

3. The cable fixing point according to claim 1 wherein said rotary mounting includes an axial bearing having a part rotatable about the axis and wherein said cable end fastening is connected with said rotatable part.

4. The cable fixing point according to claim 1 wherein said means for control includes a braking device for braking a rotational movement of the cable.

5. The cable fixing point according to claim 3 wherein said axial bearing is an axial pendular bearing and said rotatable part is mounted to be pendular.

6. The cable fixing point according to claim 3 wherein said rotary mounting includes a pivot mechanism for said axial bearing for alignment of the axis within an angular range relative to a direction of travel of the at least one load carrier.

7. The cable fixing point according to claim 6 wherein said pivot mechanism includes a joint for pivoting of said axial bearing about one of a point, a pivot axis, and a first pivot axis and a second pivot axis arranged to be non-parallel relative to the first pivot axis.

8. The cable fixing point according to claim 7 wherein said joint is one of a cardan joint and a ball joint.

9. An elevator for transporting at least one load carrier by at least one cable movable in a longitudinal direction comprising:

a cable fixing point attached to a cable end of the at least one cable and to a support structure, a segment of cable disposed at the cable end being under a tension force in a direction that is variable in dependence on a position of the at least one load carrier, said cable fixing point including a mounting permitting a longitudinal axis of the cable segment to be aligned relative to a direction of travel of the at least one load carrier by the tension force, and including means for control of a torsional moment acting about the longitudinal axis on the cable at the cable end, said means for control being connected to said mounting, wherein said means for control includes a drive for transmission of a torsional moment to at least one of said mounting, a cable end fastening attached to the cable end and the cable.

10. The elevator according to claim 9 wherein the mounting aligns the axis of the cable segment in the direction of the tension force.

11. The elevator according to claim 9 wherein the mounting rotates the cable segment about the axis of the cable segment in response to a torsional moment applied to the cable segment.

12. The elevator according to claim 9 wherein said cable fixing point includes a cable end fastening connected between the cable end and said mounting.

13. The elevator according to claim 9 wherein said means for control includes a braking device for braking a rotational movement of the cable.

* * * * *